US008630550B2

(12) United States Patent
Lee et al.

(10) Patent No.: US 8,630,550 B2
(45) Date of Patent: Jan. 14, 2014

(54) OPTICAL REPEATER AND OPTICAL SIGNAL AMPLIFYING METHOD THEREOF

(75) Inventors: Mun Seob Lee, Daejeon (KR); Jong Deog Kim, Daejeon (KR); Dongsoo Lee, Gwangju (KR); Sung Chang Kim, Gwangju (KR); Hark Yoo, Gwangju (KR); Geun Yong Kim, Goyang-si (KR); Youngsuk Lee, Gwangju (KR); Sim-Kwon Yoon, Gwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 99 days.

(21) Appl. No.: 13/221,306

(22) Filed: Aug. 30, 2011

(65) Prior Publication Data

US 2012/0163830 A1 Jun. 28, 2012

(30) Foreign Application Priority Data

Dec. 23, 2010 (KR) ........................ 10-2010-0133074

(51) Int. Cl.
*H04B 10/00* (2013.01)
(52) U.S. Cl.
USPC ............................... 398/177; 398/37; 398/98
(58) Field of Classification Search
USPC .............. 398/11, 15, 18, 27, 177, 37, 98–103
See application file for complete search history.

(56) References Cited

U.S. PATENT DOCUMENTS

| 5,633,749 | A  | * | 5/1997  | Shibuya ................ 359/341.43 |
| 5,943,146 | A  | * | 8/1999  | Harano ...................... 398/31 |
| 7,362,498 | B1 | * | 4/2008  | Li et al. .................. 359/341.41 |
| 7,551,852 | B2 | * | 6/2009  | Reintjes et al. ................ 398/33 |
| 7,773,886 | B2 | * | 8/2010  | Hainberger et al. ............ 398/97 |
| 8,036,538 | B2 | * | 10/2011 | Wang et al. ................. 398/181 |
| 2004/0062557 | A1 | * | 4/2004 | Takashima et al. ........... 398/209 |
| 2009/0028562 | A1 |   | 1/2009 | Gianordoli et al. |

FOREIGN PATENT DOCUMENTS

| JP | 2002-237784 | * | 8/2002 |
| JP | 2008-166719 |   | 7/2008 |
| KR | 1020090004913 |   | 1/2009 |

OTHER PUBLICATIONS

Jun Endo et al, "An SOA based Automatic Gain/Loss Controlled Optical Preamplifier for the Wide Input Dynamic Range", B-10-128, General Convention of 2001, The Institute of Electronics, Information and Communication Engineers of Japan, p. 561.*

Nesset, D. et al., "10 Gbit/s Bidirectional Transmission in 1024-way Split, 110 km Reach, PON System using Commercial Transceiver Modules, Super FEC and EDC," ECOC 2005 Proceedings, vol. 2:135-138 (2005).

* cited by examiner

*Primary Examiner* — Leslie Pascal
(74) *Attorney, Agent, or Firm* — Nelson Mullins Riley & Scarborough LLP; Anthony A. Laurentano, Esq.; Dipti Ramnarain, Esq.

(57) ABSTRACT

Disclosed is an optical amplifier which includes an upward optical amplifier configured to amplify an input upward optical signal of an input optical signal; and a control circuit configured to control an operation of the upward optical amplifier according to whether an upward stream is detected from the input upward optical signal.

14 Claims, 4 Drawing Sheets

OPTICAL REPEATER AND OPTICAL SIGNAL AMPLIFYING METHOD THEREOF

CROSS-REFERENCE TO RELATED APPLICATIONS

This application claims the benefits, under 35 U.S.C. §119, of Korean Patent Application No. 10-2010-0133074 filed Dec. 23, 2010, the entirety of which is incorporated by reference herein.

BACKGROUND

Exemplary embodiments relate to a passive optical network, and more particularly, relate to an optical repeater of a passive optical network of a time division multiple access (CDMA) manner and an optical signal amplifying method thereof.

Various network structures have been proposed to establish a subscriber line. For example, xDSL (x-Digital Subscriber Line), HFC (Hybrid Fiber Coax), FTTB (Fiber To The Building), FTTC (Fiber To The Curb), FTTH (Fiber To The Home), and the like have been proposed. The FTTB, FTTC, and FTTH may be divided into an active FFTx (x=B, C, or H) realized by an active optical network (AON) and a passive FFTx realized by a passive optical network (PON).

The passive optical network may indicate a subscriber network constituting an optical line using passive components such as an optical multiplexer, a demultiplexer, a coupler, and the like. The passive optical network may have a point-to-multipoint structure in which a plurality of optical network terminals (or, units), that is, optical network terminals (ONTs) or optical network units (ONUs) share one optical line terminal (OLT) via passive elements.

The passive optical network may be divided into a Time Division Multiplexing Access-Passive Optical Network (TDMA-PON) and a Wavelength Division Multiplexing Access-Passive Optical Network (WDMA-PON). In the TDMA-PON, data may be transmitted using a time slot assigned to each subscriber. In the WDMA-PON, data may be transmitted using a wavelength assigned to each subscriber.

A typical TDMA-PON may include a bi-directional optical amplifying device for amplifying upward and downward optical signals, respectively. However, in the event that a burst mode transfer manner is applied to the typical TDMA-PON, it is difficult to provide a stable service due to influence of a noise caused when an optical signal is amplified. For this reason, it is difficult to increase a subscriber number and a distance of distinct transmission.

SUMMARY

An optional repeater and its optical signal amplifying method are provided to increase a subscriber number and a distance of distinct transmission, in a passive optical network of a CDMA manner.

One aspect of embodiments of the inventive concept is directed to provide an optical amplifier which comprises an upward optical amplifier configured to amplify an input upward optical signal of an input optical signal; and a control circuit configured to control an operation of the upward optical amplifier according to whether an upward stream is detected from the input upward optical signal.

In this embodiment, the control circuit controls the upward optical amplifier to make an amplification operation on the input upward optical signal when the upward stream is detected from the input upward optical signal and to stop the amplification operation of the input upward optical signal when the upward stream is not detected from the input upward optical signal.

In this embodiment, when the amplification operation on the input upward optical signal is performed, the control circuit controls a gain of the upward optical amplifier based upon an average power of the input upward optical signal and an average power of an output upward optical signal generated by amplifying the input upward optical signal.

In this embodiment, the upward optical amplifier is a semiconductor optical amplifier.

In this embodiment, the optical amplifier further comprises a downward optical amplifier configured to amplify an input downward optical signal of the input optical signal.

In this embodiment, the downward optical amplifier is formed of one of an erbium doped fiber amplifier and a praseodymium doped fiber amplifier.

Another aspect of embodiments of the inventive concept is directed to provide an optical repeater which comprises an upward optical amplifier being turned on or off in response to a control signal and configured to generate an output upward optical signal by amplifying an input upward optical signal when turned on; and a control circuit configured to generate the control signal according to whether an upward stream is detected from the input upward optical signal.

In this embodiment, the optical repeater further comprises a photo-diode configured to generate an extraction signal by extracting the input upward optical signal, and the control circuit judges whether the upward stream is detected from the input upward optical signal, using the extraction signal.

In this embodiment, the control circuit comprises a fast stream detector configured to generate a detection signal, indicating whether the upward stream is detected from the input upward optical signal, using the extraction signal; and an upward optical amplifier configured to generate the control signal in response to the detection signal.

In this embodiment, the optical repeater further comprises a first photo-diode configured to generate a first extraction signal by extracting the input upward optical signal; and a second photo-diode configured to generate a second extraction signal by extracting an output upward optical signal. The control circuit comprises a first power detector configured to measure an average power of the input upward optical signal from the first extraction signal; a second power detector configured to measure an average power of the output upward optical signal from the second extraction signal; and an upward optical amplifier driver configured to control a gain of the upward optical amplifier based upon the average powers of the input and output upward optical signals.

In this embodiment, a gain of the upward optical amplifier is controlled by a bias current, and the upward optical amplifier driver adjusts a magnitude of the bias current such that an average power of the output upward optical signal constantly maintains a reference value.

Still another aspect of embodiments of the inventive concept is directed to provide an optical signal amplifying method of an optical repeater. The optical signal amplifying method comprises extracting an input upward optical signal; judging whether an upward stream is detected, using an extraction signal on the input upward optical signal; and controlling an amplification operation on the input upward optical signal according to whether the upward stream is detected.

In this embodiment, that the upward stream is detected is decided when a voltage level of the extraction signal is identical to or higher than a reference level, and that the upward stream is not detected is decided when a voltage level of the extraction signal is lower than the reference level.

In this embodiment, the controlling an amplification operation on the input upward optical signal according to whether the upward stream is detected comprises performing an amplification operation on the upward optical signal when the upward stream is detected; and stopping the amplification operation on the upward optical signal when the upward stream is not detected.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
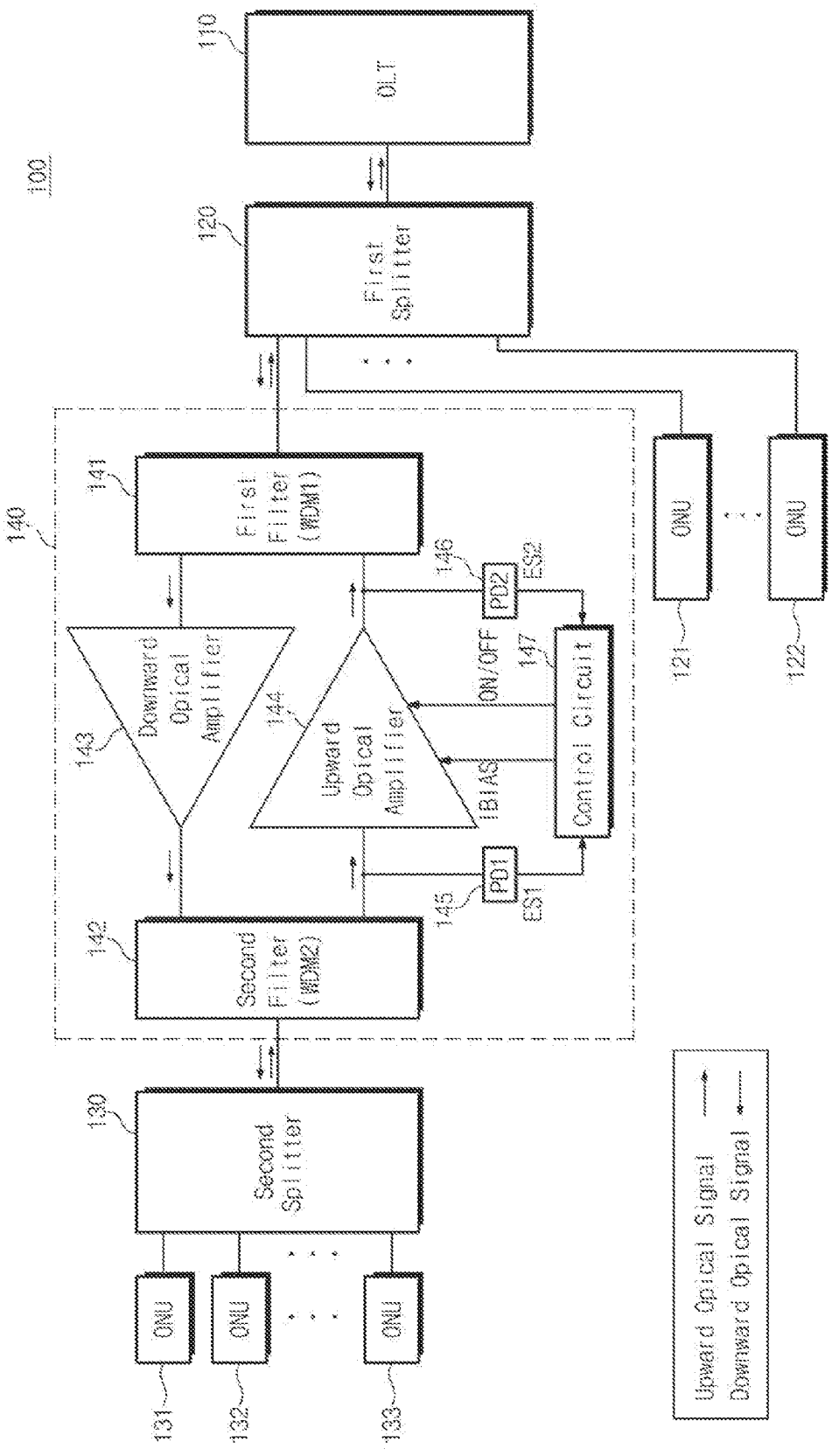
FIG. 1 is a block diagram illustrating a passive optical network according to an exemplary embodiment of the inventive concept.

The inventive concept is described more fully hereinafter with reference to the accompanying drawings, in which embodiments of the inventive concept are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram illustrating a passive optical network according to an exemplary embodiment of the inventive concept. Referring to FIG. 1, a passive optical network 100 may include an optical line terminal (OLT) 110, splitters 120 and 130, an optical repeater 140, and optical network units (ONU) 121, 122, and 131 to 133.

As illustrated in FIG. 1, the passive optical network 100 may be constituted to have a multi-stage tree structure. For example, some 121 and 122 (hereinafter, referred to as the first optical network units) of the optical network units 121, 122, and 131 to 133 may be coupled with the first splitter 120 via corresponding optical lines, and the remaining 131 to 133 (hereinafter, referred to as the second optical network units) may be coupled with the second splitter 130 via corresponding optical lines. Herein, the first splitter 120 may correspond to an upper stage, and the second splitter 130 may correspond to a lower stage. In general, each of optical lines connecting a splitter and optical network units or a remote node and optical network units may be called a subscriber line.

The optical line terminal 110 may correspond to the uppermost node of the passive optical network 100, and may be coupled with the first splitter 120 via an optical line. In general, an optical line connecting the optical line terminal 110 and a splitter may be called a feeder fiber. Although not shown in FIG. 1, the optical line terminal 110 may be a constituent element of a central office (CO).

The first splitter 120 may multiplex upward optical signals transmitted from the first optical network units 121 and 122 and the optical repeater 140, and may send the multiplexed upward optical signals to the optical line terminal 110. At this time, the upward optical signals may be time division multiplexed. Further, the first splitter 120 may demultiplex downward optical signals transmitted from the optical line terminal 110, and may distribute the demultiplexed downward optical signals to the first optical network units 121 and 122 and the optical repeater 140.

The second splitter 130 may multiplex upward optical signals transmitted from the second optical network units 131 to 133, and may send the multiplexed upward optical signals to the optical repeater 140. Further, the second splitter 130 may demultiplex downward optical signals transmitted from the optical repeater 140, and may distribute the demultiplexed downward optical signals to the second optical network units 131 to 133.

The optical repeater 140 may be connected between the first and second splitters 120 and 130, and may relay and amplify upward and downward optical signals. The optical repeater 140 may include wavelength division multiplexing (WDM) filters 141 and 142, an upward optical amplifier 144, photo-diodes 145 and 146, and a control circuit 147.

The wavelength division multiplexing filters 141 and 142 may merge and divide upward and downward optical signals having different wavelengths via wavelength division multiplexing. The first wavelength division multiplexing filter 141 (hereinafter, referred to as the first filter) may merge and divide upward and downward optical signals between the first splitter 120 and optical amplifiers 143 and 144. The second wavelength division multiplexing filter 142 (hereinafter, referred to as the second filter) may merge and divide upward and downward optical signals between the second splitter 130 and the optical amplifiers 143 and 144.

The downward optical amplifier 143 may amplify an input downward optical signal transferred from the first filter 141 to generate an output downward optical signal. The downward optical amplifier 143 may transfer the output downward optical signal to the second filter 142. In an exemplary embodiment of the inventive concept, the downward optical amplifier 143 may be formed of one of an erbium doped fiber amplifier (EDFA) and a praseodymium doped fiber amplifier (PDFA).

The upward optical amplifier 144 may amplify an input upward optical signal transferred from the second filter 142 to generate an output upward optical signal. The upward optical amplifier 144 may transfer the output upward optical signal to the first filter 141. In an exemplary embodiment of the inventive concept, the upward optical amplifier 144 may be formed of a semiconductor optical amplifier (SOA). The upward optical amplifier 144 may operate responsive to the control of the control circuit 147. For example, the upward optical amplifier 144 may vary a gain according to a bias current IBIAS provided from the control circuit 147. The upward optical amplifier 144 may be turned on or off in response to a control signal ON/OFF provided from the control circuit 147.

The first photo-diode 145 may extract the input upward optical signal. The first photo-diode 145 may convert the extracted input upward optical signal into the first extraction signal ES1 being an electric signal. The first photo-diode 145 may send the first extraction signal ES1 to the control circuit 147.

The second photo-diode 146 may extract the output upward optical signal. The second photo-diode 146 may convert the extracted output upward optical signal into the second extraction signal ES2 being an electric signal. The second photo-diode 146 may send the second extraction signal ES2 to the control circuit 147.

The control circuit 147 may generate the bias current IBIAS for controlling a gain of the upward optical amplifier 144 based upon an average power of the input and output upward optical signals. Herein, the average power of the input upward optical signal may be measured from the first extraction signal ES1, and the average power of the output upward optical signal may be measured from the second extraction signal ES2. The control circuit 147 may generate the control signal ON/OFF for controlling an operation of the upward optical amplifier 144 according to whether an upward stream is detected from the input upward optical signal. Whether an upward stream is detected from the input upward optical signal may be judged using the first extraction signal ES1 on the input upward optical signal. The control circuit 147 will be more fully described with reference to FIG. 2.

As described above, the passive optical network 100 may use a time division multiple access manner. With the time division multiple access manner, upward streams generated from the optical network units 121, 122, and 131 to 133 may be time division multiplexed, and the time division multiplexed upward streams may be transmitted to the optical line terminal 110. That is, an upward optical signal may include time division multiplexed upward streams. In the passive optical network 100 using the CDMA manner, each of the optical network units 121, 122, and 131 to 133 may transmit upward streams during an assigned time slot. This may be to prevent upward streams from be collided each other during transmitting of upward streams to the optical line terminal 110.

In general, amplified spontaneous emission (ASE) noise may arise during an operation of the optical amplifier. The ASE noise may arise when the optical amplifier is turned on at a time slot where no stream is transmitted. Hereinafter, in the event that a time division multiplexed stream is transmitted via the time slot where the ASE noise arises, the stability of optical signal transmitting and receiving may be lowered. If the ASE noise arises at a time slot where no stream is transmitted, it is difficult to use a time slot efficiently. This may become a factor hindering an increase in a subscriber number and a distance of distinct transmission. The optical repeater 140 according to an exemplary embodiment of the inventive concept may include the control circuit 147 which is configured to control an operation of the upward optical amplifier 144 according to whether an upward stream is detected from an input upward optical signal.

Figure 2:
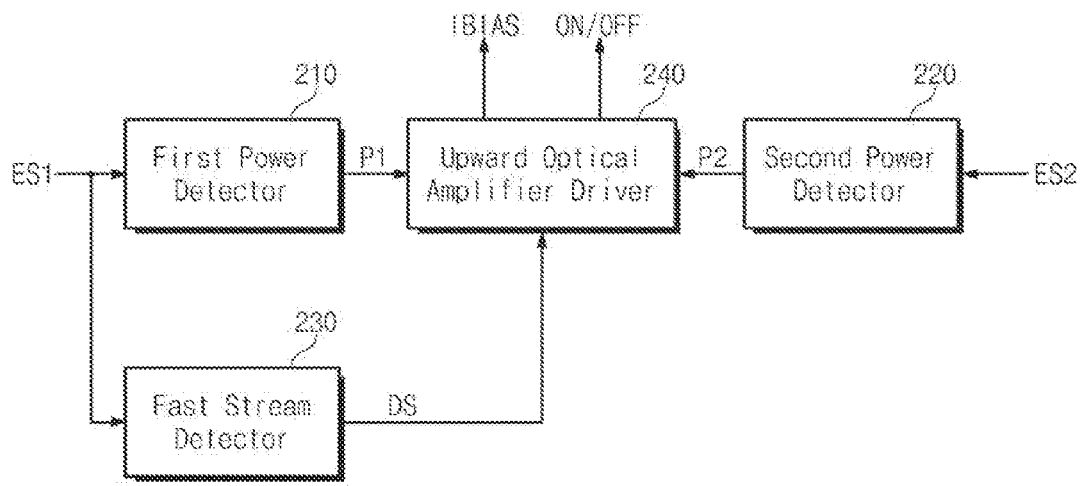
FIG. 2 is a block diagram illustrating a control circuit in an optical repeater in FIG. 1.

FIG. 2 is a block diagram illustrating a control circuit in an optical repeater in FIG. 1. Referring to FIG. 2, a control circuit 147 may include the first and second power detectors 210 and 220, a fast stream detector 230, and an upward optical amplifier driver 240.

The first power detector 210 may measure an average power P1 (hereinafter, referred to as the first average power) of an input upward optical signal from the first extraction signal ES1 transferred from the first photo-diode 145 in FIG.1. The second power detector 220 may measure an average power P2 (hereinafter, referred to as the second average power) of an output upward optical signal from the second extraction signal ES2 transferred from the second photo-diode 146 in FIG.1.

The fast stream detector 230 may judge whether an upward stream is detected from the input upward optical signal, using the first extraction signal ES1 transferred from the first photo-diode 145. The fast stream detector 230 may generate a detection signal DS indicating whether an upward stream is detected from the input upward optical signal. For example, the fast stream detector 230 may generate the detection signal DS having a high level when a voltage level of the first extraction signal ES1 is identical to or higher than a reference level. The fast stream detector 230 may generate the detection signal DS having a low level when a voltage level of the first extraction signal ES1 is lower than the reference level.

The upward optical amplifier driver 240 may generate a bias voltage IBIAS for controlling a gain of an upward optical amplifier 144 in FIG. 1 based upon the first and second average powers P1 and P2. At this time, the gain of the upward optical amplifier 144 may be controlled by the bias current IBIAS, and a magnitude of the bias current IBIAS may be adjusted such that the second average power P2 constantly maintains a predetermined reference value. The upward optical amplifier driver 240 may generate a control signal ON/OFF for controlling an operation of the upward optical amplifier 144 in response to the detection signal DS transferred from the fast stream detector 230.

Figure 3:
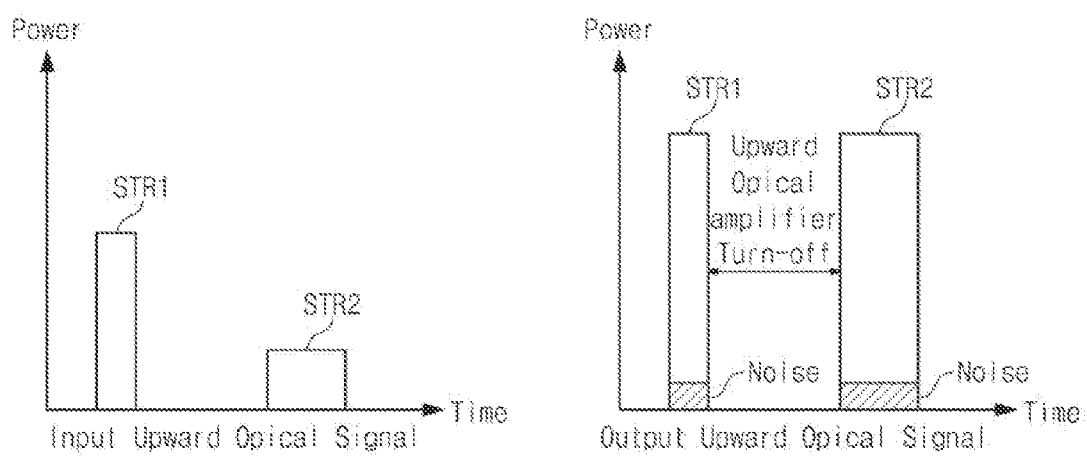
FIG. 3 is a diagram illustrating input and output upward optical signals of an optical repeater in FIG. 1.

FIG. 3 is a diagram illustrating input and output upward optical signals of an optical repeater in FIG. 1. Input and output upward optical signals each including the first and second upward streams STR1 and STR2 are exemplarily illustrated in FIG. 3 to describe an operation of an optical repeater 140 according to an exemplary embodiment of the inventive concept. In the input and output upward optical signals, a period where an upward stream is not transmitted may exist between transmission periods of the first and second upward streams STR1 and STR2. As described above, the input upward optical signal may be an upward optical signal before amplification of an upward optical amplifier, and the output upward optical signal may be an upward optical signal after amplification of the upward optical amplifier.

As illustrated in FIG. 3, the first and second upward streams STR1 and STR2 may be amplified to have the same power. At this time, ASE noise may arise at time slots corresponding to the amplified first and second upward streams STR1 and STR2.

According to an exemplary embodiment of the inventive concept, during a period where an upward stream is not transmitted, an upward optical amplifier 144 may be turned off to stop an amplification operation. This means that no ASE noise arises. Accordingly, influence of the ASE noise may be reduced although new upward streams generated by time division multiplexing are transmitted via time slots each corresponding to a period where no upward stream is transferred.

Figure 4:
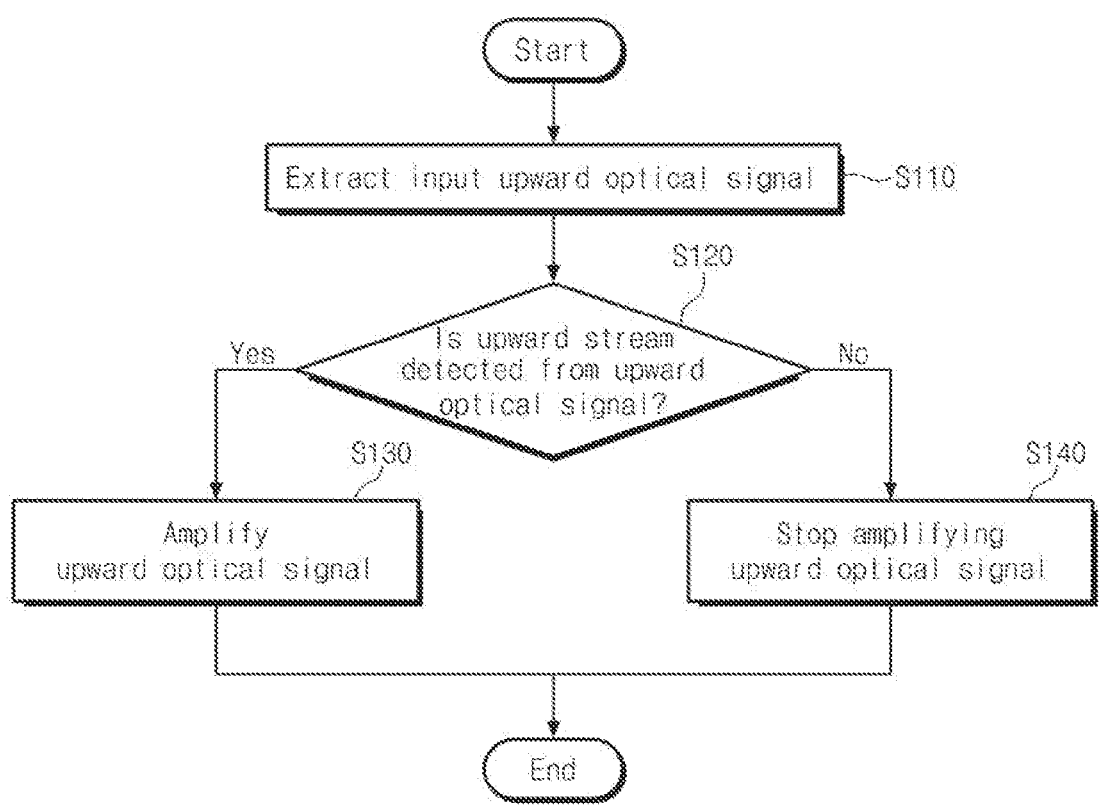
FIG. 4 is a flowchart for describing an optical signal amplifying method of an optical repeater according to an exemplary embodiment of the inventive concept.

FIG. 4 is a flowchart for describing an optical signal amplifying method of an optical repeater according to an exemplary embodiment of the inventive concept. Referring to FIG. 4, in operation S110, an upward optical signal input to an upward optical amplifier of an optical repeater may be extracted. At this time, a part (e.g., about 10%) of a power of the input upward optical signal can be extracted.

In operation S120, whether an upward stream is detected from the input upward optical signal may be judged. As described above, whether an upward stream is detected from the input upward optical signal may be judged using an extraction signal on the input upward optical signal. For example, that a voltage level of the extraction signal is identical to or higher than a reference level may indicate that an upward stream is detected from the input upward optical signal. On the other hand, that a voltage level of the extraction signal is lower than a reference level may indicate that an upward stream is not detected from the input upward optical signal.

One of operations S130 and S140 may be executed according to whether an upward stream is detected from the input upward optical signal. If an upward stream is detected from the input upward optical signal, in operation S130, an amplification operation on the upward optical signal may be carried out. If an upward stream is not detected from the input upward optical signal, in operation S140, an amplification operation on the upward optical signal may be stopped. The operations S110 to S140 may be iterated every predetermined time.

Figure 5:
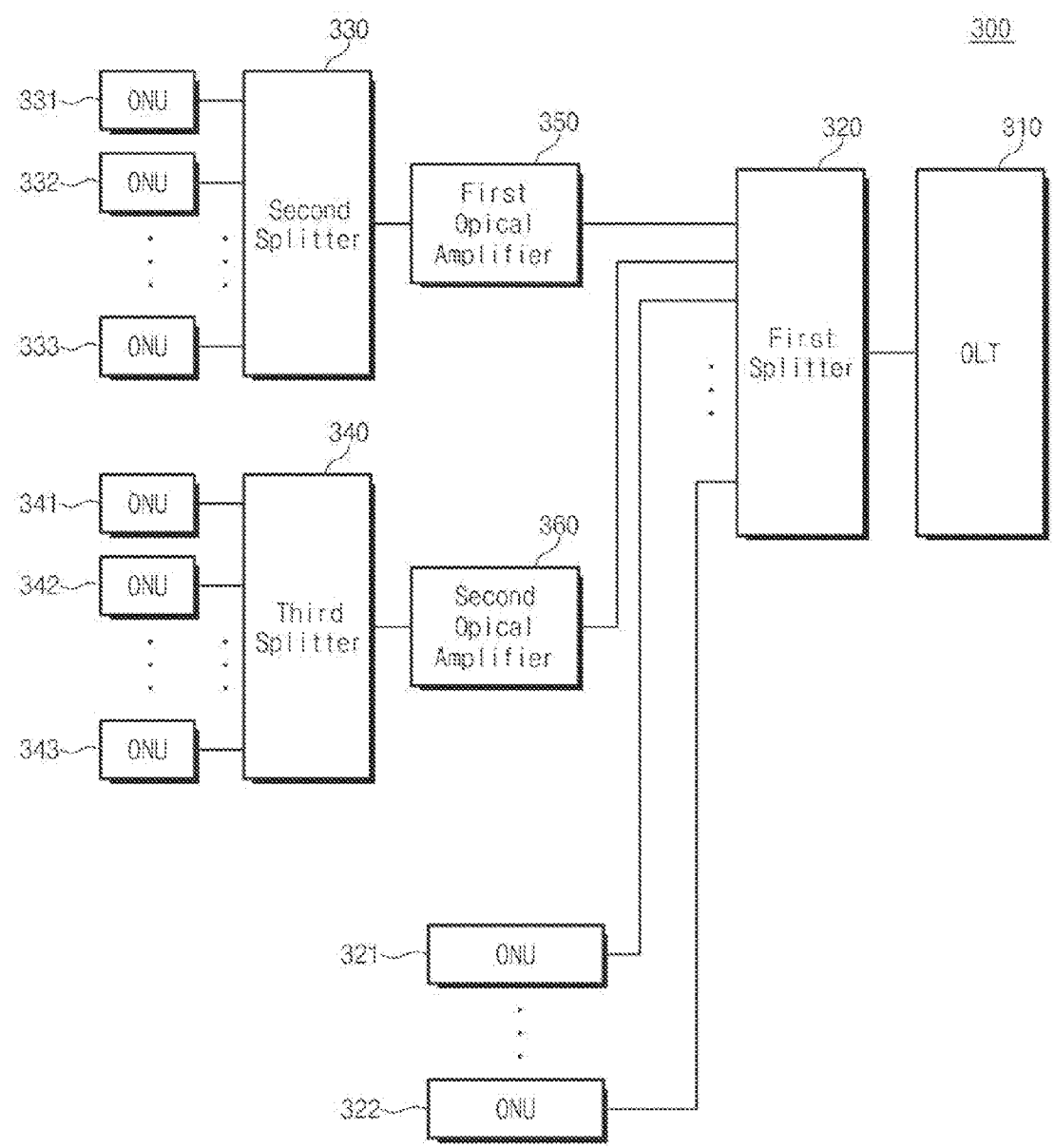
FIG. 5 is a block diagram illustrating a passive optical network according to another exemplary embodiment of the inventive concept.

FIG. 5 is a block diagram illustrating a passive optical network according to another exemplary embodiment of the inventive concept. Referring to FIG. 5, a passive optical network 300 may include an optical line terminal (OLT) 310, the first to third splitters 331 to 333 and 341 to 343, the first and second optical repeaters 350 and 360, and optical network units 321, 322, 331 to 333, and 341 to 343. The first splitter 320 may correspond to an upper stage, and the second and third splitters 330 and 340 may correspond to a lower stage. Description duplicated with a passive optical network 100 in FIG. 1 may be skipped.

As illustrated in FIG. 5, the splitter 310 of the upper stage may be coupled with at least two splitters 330 and 340 of the lower stage. For example, the first optical repeater 350 may be connected between the first and second splitters 320 and 330, and the second optical repeater 360 may be connected between the first and second splitters 320 and 340.

Herein, the first and second optical repeaters 350 and 360 may be configured the same as an optical repeater 140 in FIG. 1. Accordingly, each of the first and second optical repeaters 350 and 360 may control an operation of an internal upward optical amplifier according to whether an upward stream is detected from an input upward optical signal.

According to exemplary embodiments of the inventive concept, it is possible to reduce influence to another optical signal due to noise generated at an amplification operation on an optical signal. Accordingly, it is possible to increase a subscriber number and a distance of distinct transmission.

The above-disclosed subject matter is to be considered illustrative, and not restrictive, and the appended claims are intended to cover all such modifications, enhancements, and other embodiments, which fall within the true spirit and scope. Thus, to the maximum extent allowed by law, the scope is to be determined by the broadest permissible interpretation of the following claims and their equivalents, and shall not be restricted or limited by the foregoing detailed description.

What is claimed is:

1. An optical amplifier, comprising:
   an upward optical amplifier configured to amplify an input upward optical signal of an input optical signal; and
   a control circuit configured to control an operation of the upward optical amplifier according to whether an upward stream is detected from the input upward optical signal,
   wherein the upward stream is generated from optical network units and transmitted to an optical line terminal,
   wherein the upward stream is time division multiplexed, and wherein the upward optical amplifier is turned off during a time slot where the upward stream is not being transmitted.

2. The optical amplifier of claim 1, wherein the control circuit controls the upward optical amplifier to make an amplification operation on the input upward optical signal when the upward stream is detected from the input upward optical signal and to stop the amplification operation of the input upward optical signal when the upward stream is not detected from the input upward optical signal.

3. The optical amplifier of claim 2, wherein when the amplification operation on the input upward optical signal is performed, the control circuit controls a gain of the upward optical amplifier based upon an average power of the input upward optical signal and an average power of an output upward optical signal generated by amplifying the input upward optical signal.

4. The optical amplifier of claim 1, wherein the upward optical amplifier is a semiconductor optical amplifier.

5. The optical amplifier of claim 1, further comprising:
a downward optical amplifier configured to amplify an input downward optical signal of the input optical signal.

6. The optical amplifier of claim 5, wherein the downward optical amplifier is formed of one of an erbium doped fiber amplifier and a praseodymium doped fiber amplifier.

7. An optical repeater comprising:
an upward optical amplifier being turned on or off in response to a control signal and configured to generate an output upward optical signal by amplifying an input upward optical signal when turned on; and
a control circuit configured to generate the control signal according to whether an upward stream is detected from the input upward optical signal,
wherein the upward stream is generated from optical network units and transmitted to an optical line terminal,
wherein the optical repeater includes a downward optical amplifier and the upward optical amplifier, and the control circuit controls only the upward optical amplifier, and
wherein the upward stream is time division multiplexed and the upward optical amplifier is turned off during a time slot where the upward stream is not being transmitted.

8. The optical repeater of claim 7, further comprising:
a photo-diode configured to generate an extraction signal by extracting the input upward optical signal, and
wherein the control circuit judges whether the upward stream is detected from the input upward optical signal, using the extraction signal.

9. The optical repeater of claim 7, wherein the control circuit comprises:
a fast stream detector configured to generate a detection signal, indicating whether the upward stream is detected from the input upward optical signal, using the extraction signal; and
an upward optical amplifier configured to generate the control signal in response to the detection signal.

10. The optical repeater of claim 7, further comprising:
a first photo-diode configured to generate a first extraction signal by extracting the input upward optical signal; and
a second photo-diode configured to generate a second extraction signal by extracting an output upward optical signal, and wherein the control circuit comprises:
a first power detector configured to measure an average power of the input upward optical signal from the first extraction signal;
a second power detector configured to measure an average power of the output upward optical signal from the second extraction signal; and
an upward optical amplifier driver configured to control a gain of the upward optical amplifier based upon the average powers of the input and output upward optical signals.

11. The optical repeater of claim 10, wherein a gain of the upward optical amplifier is controlled by a bias current, and the upward optical amplifier driver adjusts a magnitude of the bias current such that an average power of the output upward optical signal constantly maintains a reference value.

12. An optical signal amplifying method of an optical repeater, comprising:
extracting an input upward optical signal;
judging whether an upward stream is detected, using an extraction signal on the input upward optical signal; and
controlling an amplification operation on the input upward optical signal according to whether the upward stream is detected,
wherein the upward stream is generated from optical network units and transmitted to an optical line terminal,
wherein the optical repeater includes a downward optical amplifier and an upward optical amplifier, and only the upward optical amplifier is controlled by the controlling step, and
wherein the upward stream is time division multiplexed and the upward optical amplifier is turned off during a time slot where the upward stream is not being transmitted.

13. The optical signal amplifying method of claim 12, wherein the upward stream is detected when a voltage level of the extraction signal is identical to or higher than a reference level, and the upward stream is not detected when a voltage level of the extraction signal is lower than the reference level.

14. The optical signal amplifying method of claim 12, wherein the controlling an amplification operation on the input upward optical signal according to whether the upward stream is detected comprises:
performing an amplification operation on the upward optical signal when the upward stream is detected; and
stopping the amplification operation on the upward optical signal when the upward stream is not detected.

* * * * *